United States Patent
Lee et al.

(10) Patent No.: US 10,051,673 B2
(45) Date of Patent: Aug. 14, 2018

(54) METHOD AND APPARATUS FOR SESSION INITIATION IN WIRELESS COMMUNICATION SYSTEM

(71) Applicant: LG ELECTRONICS INC., Seoul (KR)

(72) Inventors: Byungjoo Lee, Seoul (KR); Giwon Park, Seoul (KR); Dongcheol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/115,652

(22) PCT Filed: Aug. 18, 2014

(86) PCT No.: PCT/KR2014/007622
§ 371 (c)(1),
(2) Date: Jul. 29, 2016

(87) PCT Pub. No.: WO2015/115715
PCT Pub. Date: Aug. 6, 2015

(65) Prior Publication Data
US 2017/0171892 A1    Jun. 15, 2017

Related U.S. Application Data

(60) Provisional application No. 61/934,855, filed on Feb. 3, 2014, provisional application No. 61/946,866, filed on Mar. 2, 2014.

(51) Int. Cl.
*H04W 4/00* (2018.01)
*H04W 76/10* (2018.01)
(Continued)

(52) U.S. Cl.
CPC ......... *H04W 76/10* (2018.02); *H04L 65/1069* (2013.01); *H04L 65/608* (2013.01);
(Continued)

(58) Field of Classification Search
CPC ...................................................... H04W 76/02
See application file for complete search history.

(56) References Cited

U.S. PATENT DOCUMENTS

2005/0091302 A1    4/2005  Soin et al.
2008/0127260 A1*   5/2008  Hong ................. H04N 7/17318
                                                            725/39
(Continued)

FOREIGN PATENT DOCUMENTS

| KR | 10-2012-0095572 | 8/2012 |
| KR | 10-2012-0103567 | 9/2012 |
| WO | 2012096546 | 7/2012 |

OTHER PUBLICATIONS

PCT International Application No. PCT/KR2014/007622, Written Opinion of the International Searching Authority dated Dec. 8, 2014, 17 pages.

*Primary Examiner* — Gerald A Smarth
(74) *Attorney, Agent, or Firm* — Lee, Hong, Degerman, Kang & Waimey

(57) ABSTRACT

An embodiment of the present invention relates to a Wi-Fi display (WFD) service initiation method comprising the steps of: in a method for a first apparatus that supports WFD initiating a WFD service, the first apparatus transmitting a WFD discovery frame to a second apparatus; and the first apparatus transmitting a real-time streaming protocol (RTSP) M1 message, wherein the first apparatus transmits one of a provision discovery request or a session initiation request to the second apparatus before transmitting the M1 message if there is an internet protocol (IP) connection
(Continued)

established between the first apparatus and the second apparatus when transmitting the WFD discovery frame.

16 Claims, 15 Drawing Sheets

(51) Int. Cl.
*H04W 76/02* (2009.01)
*H04L 29/06* (2006.01)
*H04W 8/00* (2009.01)
*H04W 84/12* (2009.01)
*H04W 80/10* (2009.01)
*H04W 80/04* (2009.01)
*H04W 80/06* (2009.01)

(52) U.S. Cl.
CPC ........... *H04W 8/005* (2013.01); *H04W 76/02* (2013.01); *H04W 80/04* (2013.01); *H04W 80/06* (2013.01); *H04W 80/10* (2013.01); *H04W 84/12* (2013.01)

(56) References Cited

U.S. PATENT DOCUMENTS

| | | |
|---|---|---|
| 2013/0227152 A1 | 8/2013 | Lee et al. |
| 2014/0210693 A1* | 7/2014 | Bhamidipati ....... H04L 65/4092 345/2.3 |
| 2014/0317239 A1* | 10/2014 | Yang ........................ H04L 65/60 709/219 |
| 2015/0319485 A1* | 11/2015 | Vedula .................. H04W 76/10 725/74 |

* cited by examiner (a)

(b)

METHOD AND APPARATUS FOR SESSION INITIATION IN WIRELESS COMMUNICATION SYSTEM

CROSS-REFERENCE TO RELATED APPLICATIONS

This application is the National Stage filing under 35 U.S.C. 371 of International Application No. PCT/KR2014/007622, filed on Aug. 18, 2014, which claims the benefit of U.S. Provisional Application No. 61/934,855, filed on Feb. 3, 2014, and 61/946,866, filed on Mar. 2, 2014, the contents of which are all hereby incorporated by reference herein in their entirety.

TECHNICAL FIELD

Following description relates to a wireless communication system, and more particularly, to a method of performing session initiation in a Wi-Fi direct display and an apparatus therefor.

BACKGROUND ART

Along with the recent development of information and communication technology, various wireless communication technologies have been developed. Among them, Wireless Local Area Network (WLAN) enables wireless access to the Internet based on radio frequency technology through a portable terminal such as a Personal Digital Assistant (PDA), a laptop computer, a Portable Multimedia Player (PMP) in a home, an office, or a specific service providing area.

The introduction of Wi-Fi Direct or Wi-Fi Peer-to-Peer (Wi-Fi P2P) is under discussion, as a direct communication technology that facilitates interconnection between devices without a wireless Access Point (AP) which is a basic requirement for a legacy WLAN system. According to Wi-Fi Direct, devices can be connected to each other without a complex establishment procedure and an operation for exchanging data at a communication rate offered by a general WLAN system can be supported to provide various services to users.

Recently, various Wi-Fi-enabled devices have been used. Among them, the number of Wi-Fi Direct-enabled devices which are Wi-Fi devices capable of communicating with each other without an AP is increasing. The Wi-Fi Alliance (WFA) has been discussing the introduction of a platform supporting various services (e.g., Send, Play, Display, Print, etc.) using a Wi-Fi Direct link. This may be referred to as Wi-Fi Direct Service (WFDS). According to WFDS, applications, services, etc. can be controlled or managed by a service platform called Application Service Platform (ASP).

A standard on a wireless LAN (WLAN) technology is developing in IEEE (Institute of Electrical and Electronic Engineers) 802.11 group. IEEE 802.11a and b use an unlicensed band in 2.4 GHz or 5 GHz and IEEE 802.11b provides transmission speed of 11 Mbps, and IEEE 802.11a provides transmission speed of 54 Mbps. IEEE 802.11g provides transmission speed of 54 Mbps by applying OFDM (Orthogonal Frequency Division Multiplexing) in 2.4 GHz. IEEE 802.11n provides transmission speed of 300 Mbps by applying MIMO-OFDM (Multiple Input Multiple Output-OFDM). IEEE 802.11n supports a channel bandwidth up to 40 MHz. In this case, IEEE 802.11n can provide transmission speed of 600 Mbps.

In WLAN environment according to IEEE 802.11e, a DLS (Direct Link Setup)-related protocol assumes that a BSS (Basic Service Set) corresponds to a QBSS (Quality BSS) supporting a QoS (Quality of Service). In the QBSS, not only a non-AP STA but also an AP corresponds to a QAP (Quality AP) that supports QoS. Yet, in a currently commercialized WLAN environment (e.g., WLAN environment according to IEEE 802.11a/b/g), although a non-AP STA corresponds to a QSTA (Quality STA) supporting QoS, most of APs correspond to a legacy AP incapable of supporting QoS. As a result, even a QSTA has a limit on using a DLS service in the currently commercialized WLAN environment.

A TDLS (Tunneled Direct Link Setup) corresponds to a wireless communication protocol newly proposed to overcome the aforementioned limit. Although the TDLS does not support QoS, the TDLS can make QSTAs establish a direct link in the currently commercialized WLAN environment such as IEE 802.11a/b/g and enable a direct link to be established in a PSM (power save mode). Hence, the TDLS regulates various procedures to make QSTAs establish a direct link in a BSS managed by a legacy AP as well. In the following, a wireless network supporting the TDLS is referred to as a TDLS wireless network.

A legacy wireless LAN mainly handles an operation of an infra structure BSS in which a wireless access point (AP) functions as a hub. An AP is in charge of a function of supporting a physical layer for establishing a wired/wireless connection, a function of routing devices in a network, a function of providing a service for adding/deleting a device to/from a network, and the like. In this case, the devices in the network are connected with each other via the AP and the devices are not directly connected with each other.

As a technology of supporting a direct connection between devices, discussion on establishing a standard for Wi-Fi Direct is in progress.

A Wi-Fi direct network corresponds to a network that Wi-Fi devices are able to perform D2D (Device to Device) (or P2P (Peer-to-Peer)) communication with each other although the Wi-Fi devices do not participate in a home network, an office network, and a hotspot network. The Wi-Fi direct network has been proposed by Wi-Fi Alliance. In the following, Wi-Fi Direct-based communication is referred to as Wi-Fi D2D communication (simply, D2D communication) or Wi-Fi P2P communication (simply, P2P communication). And, a device for performing the Wi-Fi P2P is referred to as a Wi-Fi P2P device, simply, a P2P device.

A WFDS network can include one or more Wi-Fi devices. A WFDS device includes devices supporting Wi-Fi such as a display device, a printer, a digital camera, a projector, a smartphone, and the like. And, the WFDS device includes a non-AP STA and an AP STA. WFDS devices belonging to a WI-DS network can be directly connected with each other. Specifically, P2P communication may indicate a case that a signal transmission path between two WFDS devices is directly configured between the WI-DS devices without passing through the third device (e.g., an AP) or a legacy network (e.g., accessing WLAN via an AP). In this case, the signal transmission path directly configured between the two WFDS devices can be restricted to a data transmission path. For example, the P2P communication may indicate a case that a plurality of non-STAs transmit data (e.g., voice/image/text message information, etc.) without passing through an AP. A signal transmission path for control information (e.g., resource allocation information for P2P configuration, wireless device identification information, etc.) can be directly configured between WFDS devices (e.g., between a non-AP STA and a non-AP STA, between a non-AP STA and an AP), can be configured between two devices (e.g., between a non-AP STA and a non-AP STA) via an AP, or can be configured between an AP and a corresponding WFDS device (e.g., between an AP and a non-AP STA #1, between an AP and a non-AP STA #2).

Wi-Fi Direct corresponds to a network connection standard technology for defining up to an operation of a link layer. Since a standard on an application, which is operating in a higher layer of a link configured by the Wi-Fi Direct, is not defined, when an application is executed after devices supporting the Wi-Fi Direct are connected with each other, it was difficult to support compatibility. In order to solve the aforementioned problem, discussion on standardizing such a higher layer application as a Wi-Fi direct service (WFDS) is in progress in Wi-Fi Alliance (WFA).

FIG. 1 illustrates components of a WFDS (Wi-Fi Direct Service) framework.

Referring to FIG. 3, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 1 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a Miracast source and a Miracast sink of the WFA.

The Application layer may provide a User Interface (UI), represent information as a human-perceivable form, and provide a user input to a lower layer.

DISCLOSURE OF THE INVENTION

Technical Task

A technical task of the present invention is to provide methods for a device already including internet protocol connection to perform session initiation.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of initializing a WFD service, which is initialized by a first device supporting WFD (Wi-Fi Display), includes the steps of transmitting a frame related to a WFD discovery to a second device by the first device and transmitting an RTSP (real-time streaming protocol) M1 message by the first device. In this case, when the frame related to the WFD discovery is transmitted, if an IP (internet protocol) connection is established between the first device and the second device, the first device can transmit either a provision discovery request or a session initiation request to the second device before the M1 message is transmitted.

To further achieve these and other advantages and in accordance with the purpose of the present invention, according to a second technical aspect of the present invention, a first device supporting WFD (Wi-Fi Display) includes a reception module and a processor, the processor configured to transmit a frame related to a WFD discovery to a second device, the processor configured to transmit an RTSP (real-time streaming protocol) M1 message. In this case, when the frame related to the WFD discovery is transmitted, if an IP (internet protocol) connection is established between the first device and the second device, the first device can transmit a provision discovery request to the second device before the M1 message is transmitted.

The first technical aspect and the second technical aspect of the present invention can include at least one of items described in the following.

When the frame related to the WFD discovery is transmitted, if an IP connection is not established between the first device and the second device, the first device can perform a connection setup procedure with the second device before the M1 message is transmitted.

The method can further include the step of receiving a provision discovery response in response to the provision discovery request.

If the provision discovery response corresponds to a positive response, the first device can initiate a TCP server operation.

The provision discovery response can include at least one selected from the group consisting of WFD IE, WSC IE and P2P IE.

The WFD IE can include a WFD device information sub element, an associated BSSID sub element, a coupled sink information sub element, a WFD extended capability sub element, an infrastructure BSS sub element, and a status sub element.

The first device can obtain information on an AP (access point) associated with the second device via the infrastructure BSS sub element.

The status sub element can indicate either the positive response or a negative response.

The positive response and the negative response can be determined by performing a user query procedure performed by the second device.

The provision discovery request can include at least one selected from the group consisting of WFD IE, WSC IE and P2P IE.

The WFD IE can include a WFD device information sub element, an associated BSSID sub element, a coupled sink information sub element, a WFD extended capability sub element, and an infrastructure BSS sub element.

The infrastructure BSS sub element can include information on an AP (access point) associated with the first device.

The session initiation request can include an IP header, a UDP (user datagram protocol) header, and a UDP datagram.

The first device may correspond to a WFD source and the second device may correspond to a WFD sink.

The method can further include the step of receiving an RTSP M1 response message from the second device. In this case, the RTSP M1 response message can include information on an RTSP method supported by the second device.

Advantageous Effects

According to the present invention, if there is pre-existing internet protocol connection, it is not necessary to establish a P2P connection or a TDLS connection again, thereby reducing an unnecessary procedure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
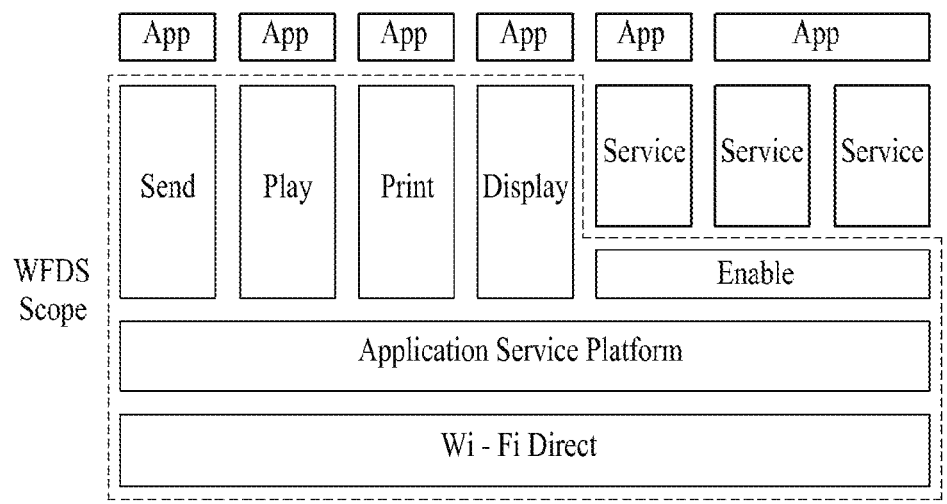
FIG. 1 is a diagram for an example of a structure of a WFDS system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, the present disclosure focuses on the IEEE 802.11 system. However, the technical features of the present invention are not limited thereto.

Wi-Fi Display

Among WFDS, a display service, i.e., Wi-Fi Display (WFD), corresponds to a service and an application enabling a screen to be shared between P2P devices.

Figure 2:
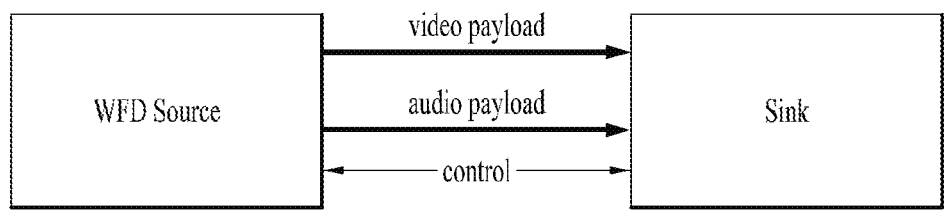
FIG. 2 is a diagram for an example of a WFD connection.

FIG. 2 is a diagram for an example of a WFD connection. In FIG. 2, a WFD source and a WFD sink correspond to WFDS devices and can be connected with each other by P2P. In this case, the WFD source may correspond to a device configured to support streaming of multimedia contents via a P2P link and the WFD sink may correspond to a device configured to receive a data set from the WFD source via the P2P link and perform a procedure of generating an image and/or sound based on the data set (the procedure may be referred to as rendering). The WFD sink can be divided into a primary sink and a secondary sink. In particular, if the secondary sink is independently connected with the WFD source, it may be able to perform rendering on an audio payload only.

Figure 3:
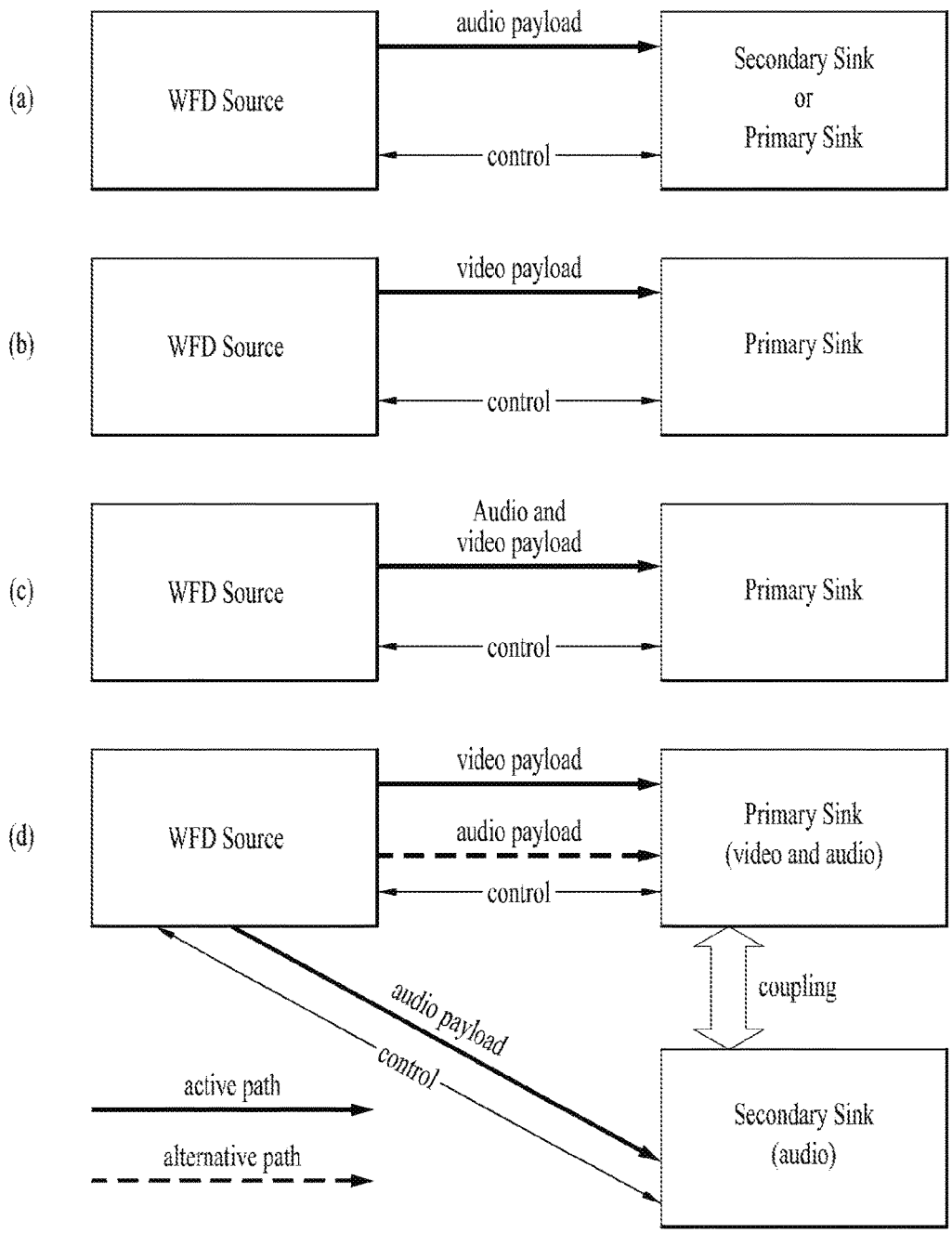
FIG. 3 is a diagram for examples of a WFD session.

FIG. 3 is a diagram for examples of a WFD session. FIG. 3 (a) shows an audio-only session. A WFD source can be connected with either a primary sink or a secondary sink. FIG. 3 (b) shows a video-only session. A WFD source is connected with a primary sink. FIG. 3 (c) shows an audio session and a video session. Similar to the case of FIG. 3 (b), a WFD sink can be connected with a primary sink only. FIG. 3 (d) shows an example of a session connection in case of a coupled sink (coupled WFD sink). In this case, a primary sink and a secondary sink can perform rendering on video and audio, respectively. Alternately, the primary sink can perform rendering on both video and audio.

Figure 4:
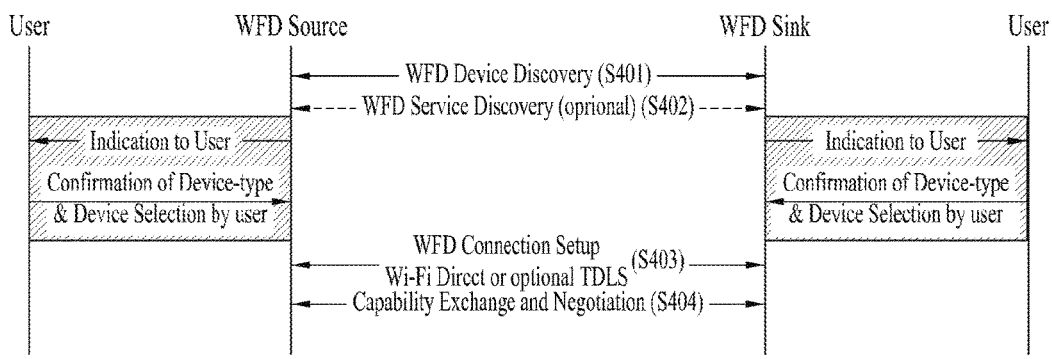
FIG. 4 is a diagram for explaining procedures necessary for establishing a WFD session.

The aforementioned session can be established after procedures shown in FIG. 4 are performed. Specifically, a session can be established after a WFD device discovery procedure S401, a WFD service discovery procedure S402, a WFD connection setup procedure S403, and a capability exchange and negotiation procedure S404 are performed. In the following, the procedures are sequentially explained.

WFD Device Discovery

A WFD source can discover a peer device for WFD, i.e., a WFD sink, via WFD device discovery.

For the WFD device discovery, WFD devices can include a WFD IE (information element) in a beacon, a probe request frame, a probe response frame and the like. In this case, the WFD IE corresponds to an information element including information on WFD such as a device type, a device state and the like. Regarding the WFD IE, it shall be explained later in detail. If a WFD device receives a probe request frame including a WFD IE, the WFD device can transmit a probe response frame including a WFD IE of the WFD device in response to the probe request frame. If the WF device is associated with an infrastructure AP and the WFD device operates as a Wi-Fi P2P device, a WFD IE and a P2P information element can be included in the probe request frame. The probe response frame, which is transmitted in response to the probe request frame, is transmitted via a channel on which the probe request frame is received and the probe response frame can include both a P2P IE and a WFD IE.

Contents related to the WFD device discovery, which are not mentioned in the foregoing description, may follow 'Wi-Fi Display Technical Specification' and/or 'Wi-Fi Peer-to-Peer (P2P) Technical Specification Wi-Fi Direct Service Addendum' document. This can be applied to following description as well.

WFD Service Discovery

Having performed the WFD device discovery, a WFD source and/or a WFD sink can discover a mutual service capability if necessary. Specifically, if one WFD device transmits a service discovery request frame of which WFD capability is included as an information sub-element, another WFD device can transmit a service discovery response frame of which WFD capability of the WFD device is included as an information sub-element in response to the service discovery request frame. In order to perform a service discovery procedure, a probe request frame and a probe response frame, which are used for a device discovery procedure, can include information indicating whether or not a WFD device has capability capable of supporting the service discovery procedure.

WFD Connection Setup

Figure 5:
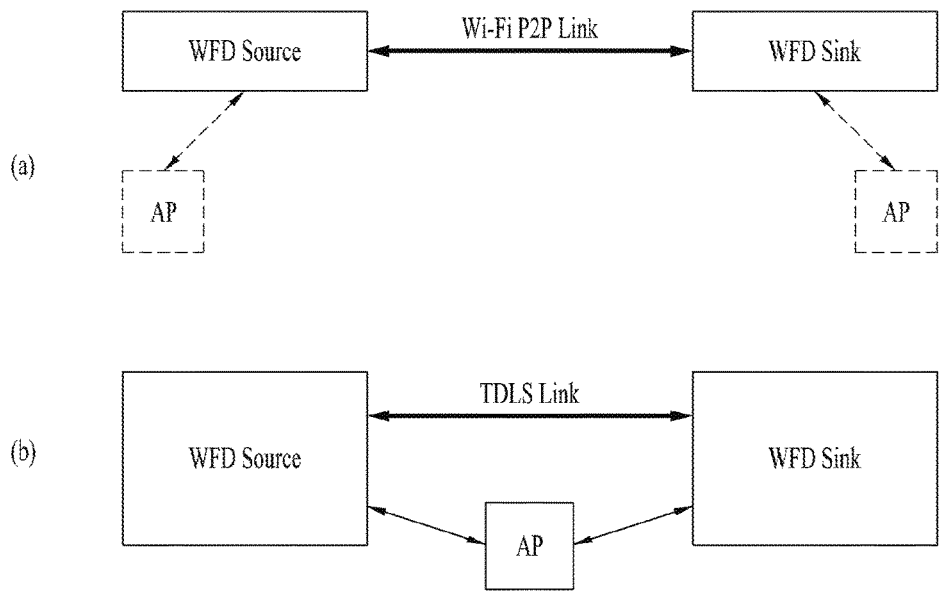
FIG. 5 is a diagram for a WFD connection topology.

Having performed the WFD device discovery procedure and optionally the WFD service discovery procedure, a WFD device can select a WFD device for performing the WFD connection setup procedure. After the WFD device for performing the WFD connection setup procedure is selected according to a policy, a user input, and the like, it may use a connectivity scheme among Wi-Fi P2P and TDLS for a WFD connection. WFD devices can determine a connectivity scheme based on preferred connectivity information and an associated BSSID sub-element which is delivered together with a WFD information element. FIG. 5 (a) and FIG. 5 (b) show a connection using the Wi-Fi P2P connectivity scheme and a connection using TDLS connectivity scheme. In FIG. 5 (a), an AP may be common to a WFD source and a WFD sink or may be different to the WFD source and the WFD sink. Or, the AP may not exist. If a WFD connection is performed using the TDLS, as shown in FIG. 5 (b), the WFD source and the WFD sink should maintain the connection with the AP.

WFD Capability Exchange and Negotiation

Figure 6:
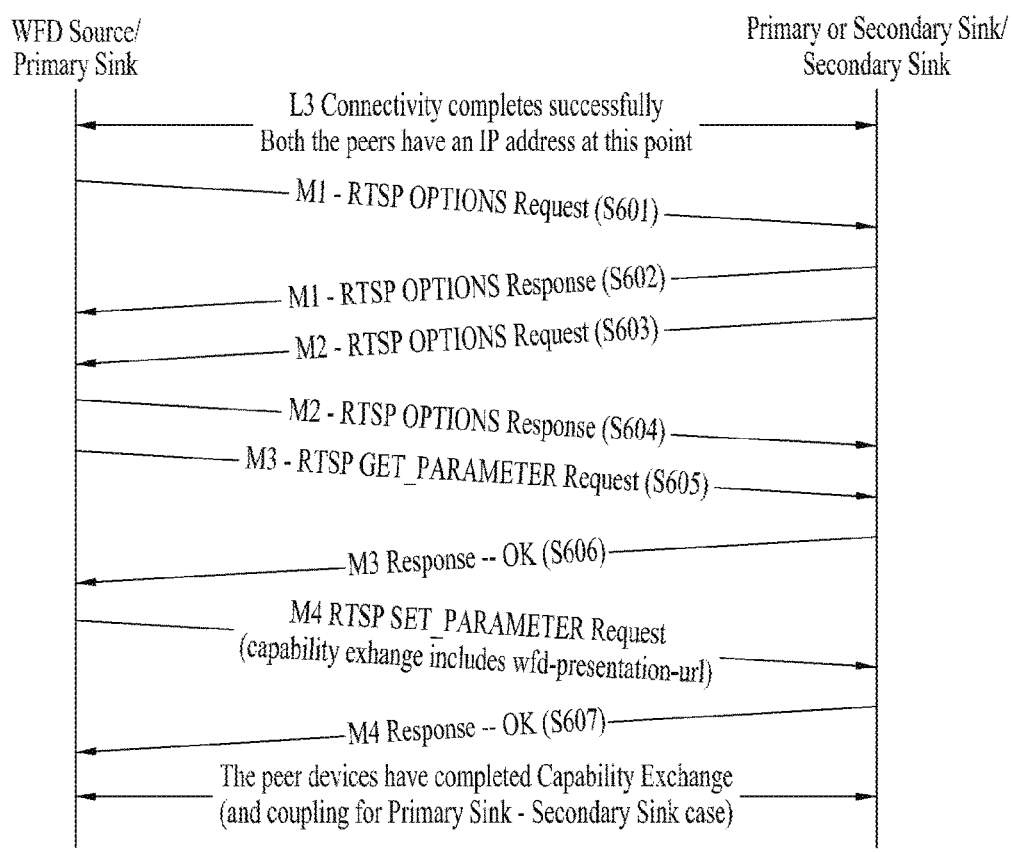
FIG. 6 is a flowchart for explaining WFD capability exchange and negotiation.

If the WFD connection setup is performed between WFD devices, a WFD device can perform the WFD capability exchange and negotiation. A WFD source and a WFD sink can deliver at least one selected from the group consisting of information on a codec supported by both the WFD source and the WFD sink, profile information of the codec, level information of the codec and resolution information to the WFD device via the WFD capability negotiation. The WFD capability exchange and negotiation procedure can be performed by exchanging a message using an RTSP (real-time streaming protocol). And, it may be able to determine a parameter set for defining an audio/video payload during a WFD session. As shown in FIG. 6, the WFD capability exchange and negotiation procedure can be performed by exchanging RTSP M1 message to RTSP M4 message.

Specifically, the WFD source can transmit RTSP M1 request message to initiate an RSTP procedure and WFD capability negotiation [S601]. The RTSP M1 message can include an RTSP OPTIONS request for determining an RTSP methods set supported by the WFD sink. Having received the RTSP M1 request message, the WFD sink can transmit an RTSP M1 response message in which RTSP methods supported by the WFD sink are listed [S602].

Subsequently, the WFD sink can transmit an RTSP M2 request message for determining an RTSP method set supported by the WFD source [S603]. Having received the RTSP M2 request message, the WFD source can transmit an RTSP M2 response message in which RTSP methods supported by the WFD source are listed in response to the RTSP M2 request message [S604].

The WFD source can transmit an RTSP M3 request message (RTSP GET_PARAMETER request message) in which a list of WFD capabilities is specified [S605]. Having received the RTSP M3 request message, the WFD sink can transmit an RTSP M3 response message (RTSP GET_PARAMETER response message) in response to the RTSP M3 request message.

The WFD source determines an optimized parameter set to be used for a WFD session based on the RTSP M3 response message and can transmit an RTSP M4 request message (RTSP SET_PARAMETER request message) including the determined parameter set to the WFD sink [S606]. Having received the RTSP M4 request message, the WFD sink can transmit an RTSP M4 response message (RTSP SET_PARAMETER response message) [S606].

WFD Session Establishment

Figure 7:
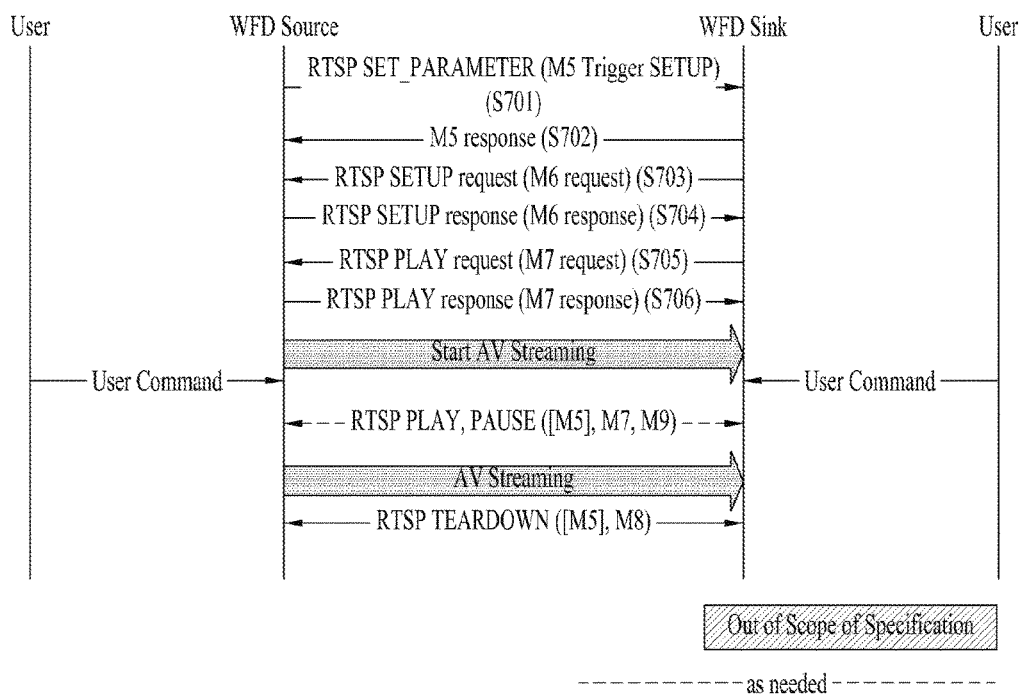
FIG. 7 is a flowchart for explaining WFD session establishment.

Having performed the WFD capability exchange and negotiation, the WFD devices can establish a WFD session via procedures shown in FIG. 7. Specifically, the WFD source can transmit an RTSP SET parameter request message (RTSP M5 Trigger SETUP request) to the WFD sink [S701]. The WFD sink can transmit an RTSP M5 response message (RTSP M5 response) to the WFD source in response to the RTSP SET parameter request message.

If the RTSP M5 message including a trigger parameter SETUP is successfully exchanged, the WFD sink can transmit an RTSP SETUP request message (RTSP M6 request) to the WFD source. Having received the RTSP M6 request message, the WFD source can transmit an RTSP SETUP response message to the WFD sink in response to the RTSP M6 request message. If a status code of the RTSP M6 response message indicates 'OK', it may indicate that an RTSP session is successfully established.

After the RTSP M6 message is successfully exchanged, the WFD sink can transmit an RTSP PLAY request message (RTSP M7 request) to the WFD source to indicate that the WFD sink is ready to receive an RTP stream. The WFD source can transmit an RTSP PLAY response message (RTSP M7 response) to the WFD sink in response to the RTSP PLAY request message. In this case, if a status code of the RTSP PLAY response message indicates 'OK', it may indicate that a WFD session is successfully established. After the WFD session is established, the WFD source can transmit an RTSP M3 request message (RTSP GET_PARAMETER request message) for obtaining capability on at least one or more RTSP parameters supported by the WFD sink, an RTSP M4 request message for setting at least one or more RTSP parameter values corresponding to a WFD session to renegotiate capability between the WFD source and the WFD sink to update an AV (audio/video) format, an RTSP M5 request message for triggering the WFD sink to transmit an RTSP PAUSE request message (RTSP M9 request message), an RTSP M12 request message for indicating that the WFD source enters a WFD standby mode, an RTSP M14 request message for selecting an input type to be used in UIBC, an input device and other parameters, an RTSP M15 request message for enabling or disenabling UIBC, and the like to the WFD sink.

Subsequently, the WFD sink can transmit an RTSP M7 request message (RTSP PLAY request message) for initiating (or resuming) audio/video streaming, an RTSP M9 request message (RTSP PAUSE request message) for pausing audio/video streaming to the WFD sink from the WFD source, an RTSP M10 request message for asking the WFD source to change an audio rendering device, an RTSP M11 request message for indicating to change an active connector type, an RTSP M12 request message for indicating that the WFD sink enters a WFD standby mode, an M13 request message for asking the WFD source to refresh IDR, an RTSP M14 request message for selecting an input type to be used in UIBC, an input device and other parameters, an RTSP M15 request message for enabling or disenabling UIBC, and the like to the WFD source. Having received the aforementioned RTSP request message from the WFD sink, the WFD source can transmit an RTSP response message to the WFD sink in response to the RTSP request message.

If a WFD session is established and audio/video streaming is initiated, the WFD source and the WFD sink can perform audio/video streaming using a codec supported by both the WFD source and the WFD sink. Since the codec supported by both the WFD source and the WFD sink is used, it is able to guarantee interoperability between the WFD source and the WFD sink.

WFD Information Element

WFD communication is performed based on WFD IE. A frame format of the WFD IE is shown in Table 1 in the following.

TABLE 1

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI (Organizationally Unique Identifier) |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

As shown in Table 1, similar to a legacy P2P IE, a WFD IE includes an element ID field, a length field, a WFD-specific OUI field, an OUI type field indicating a type/version of the WFD IE, and a WFD subelement field. The WFD subelement field has a form shown in Table 2 in the following.

TABLE 2

| Field | Size (octets) | Value (Hexadecimal) | Description |
|---|---|---|---|
| Subelement ID | 1 | | Identifying the type of WFD subelement. (For details, refer to Table 3) |
| Length | 2 | Variable | Length of the following fields in the subelement |
| Subelements body field | Variable | | Subelement specific information fields |

TABLE 3

| Subelement ID (Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

The subelement field of 1 octet indicates information included in the WFD subelement field. Specifically, values 0, 1, ... 10 included in the subelement field can indicate that each of subelements corresponds to WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, Alternative MAC Address subelement, respectively. In this case, the WFD Device Information subelement includes informations necessary for determining whether to attempt pairing with a WFD device and session generation. The Associated BSSID subelement is used to indicate an address of a currently associated AP. The WFD Audio Formats subelement, the WFD Video Formats subelement, and the WFD 3D Video Formats subelement are used to indicate capability of a WFD device related to audio, video, and 3D video, respectively. The WFD Content Protection subelement delivers information on a content protection scheme and the Coupled Sink Information subelement delivers information on a status of a coupled sink, MAC address, and the like. The WFD Extended Capability subelement is used to deliver information on various capabilities of other WFD device and the Local IP Address subelement is used to deliver an IP address to a WFD peer in a TDLS setup procedure. The WFD Session Information subelement includes such information as a list of WFD device information descriptions in a WFD group. If a WFD connection scheme requires an interface (e.g., MAC address) different from an interface used in device discovery, the Alternative MAC Address subelement can deliver information on the interface.

Subsequently, the Subelement body field includes detail information of a subelement corresponding to a subelement ID. For example, in case of the WFD Device Information subelement, as shown in Table 4 in the following, the subelement body field can include a WFD Device Information subfield including information on a WFD device, a Session Management Control Port subfield indicating TCP port information for receiving an RTSP message, and a WFD Device Maximum Throughput subfield indicating information on a maximum average throughput.

TABLE 4

| Field | Size (octets) | Value | Description |
|---|---|---|---|
| Subelement ID | 1 | 0 | Identifying the type of WFD subelement. (For details, refer to Table 3) |
| Length | 2 | 6 | Length of the following fields of the subelement. |
| WFD Device Information | 2 | | Refer to Table 5 |
| Session Management Control Port | 2 | Valid TCP port | Default 7236. TCP port at which the WFD Device listens for RTSP messages. (If a WFD Sink that is transmitting this subelement does not support the RTSP server function, this field is set to all zeros.) The WFD Device can choose any value other than default 7236. |
| WFD Device Maximum Throughput | 2 | | Maximum average throughput capability of the WFD Device represented in multiples of 1 Mbps |

TABLE 5

| Bits | Name | Interpretation |
|---|---|---|
| 1:0 | WFD Device Type bits | 0b00: WFD Source<br>0b01: Primary Sink<br>0b10: Secondary Sink<br>0b11: dual-role possible, i.e., either a WFD Source or a Primary Sink |
| 2 | Coupled Sink Operation Support at WFD Source bit | 0b0: Coupled Sink Operation not supported by WFD Source.<br>0b1: Coupled Sink Operation supported by WFD Source<br>This bit is valid for WFD Device Type bits set to value 0b00 or 0b11. When WFD Device Type bits value is 0b01 or 0b10, the value of this b2 is ignored upon receiving. |
| 3 | Coupled Sink Operation Support at WFD Sink bit | 0b0: Coupled Sink Operation not supported by WFD Sink<br>0b1: Coupled Sink Operation supported by WFD Sink<br>This bit is valid for WFD Device Type bits set to value 0b01, 0b10 or 0b11. When WFD Device Type bits value is 0b00, the value of this b3 is ignored upon receiving. |
| 5:4 | WFD Session Availability bits | 0b00: Not available for WFD Session<br>0b01: Available for WFD Session<br>0b10, 0b11: Reserved |
| 6 | WSD Support bit | 0b0: WFD Service Discovery (WSD): Not supported<br>0b1: WFD Service Discovery (WSD): Supported |
| 7 | PC bit | 0b0: Preferred Connectivity (PC): P2P<br>0b1: Preferred Connectivity (PC): TDLS |
| 8 | CP Support bit | 0b0: Content Protection using the HDCP system 2.0/2.1: Not supported<br>0b1: Content Protection using the HDCP system 2.0/2.1: Supported |
| 9 | Time Synchronization Support bit | 0b0: Time Synchronization using 802.1AS: Not supported<br>0b1: Time Synchronization using 802.1AS: Supported |

TABLE 5-continued

| Bits | Name | Interpretation |
|---|---|---|
| 10 | Audio un-supported at Primary Sink bit | 0b0: all cases except below<br>0b1: If B1B0 = 0b01 or 0b11, and this WFD Device does not support audio rendering when acting as a Primary Sink |
| 11 | Audio only support at WFD Source bit | 0b0: all cases except below<br>0b1: If B1B0 = 0b00 or 0b11, and this WFD Device supports transmitting audio only elementary stream when acting as a WFD Source |

According to the aforementioned descriptions, in a WFD, i.e., Miracast, although there is an IP connection established between a source and sink via P2P or an infrastructure BSS, a connection is established again from a layer 2 connection via a scheme among a P2P and a TDLS scheme. Hence, it is inefficient. In the following, when an IP connection is established between a first device and a second device, a method of initiating a service/session without a process of reestablishing a layer 2 connection is explained.

Embodiment 1

Figure 8:
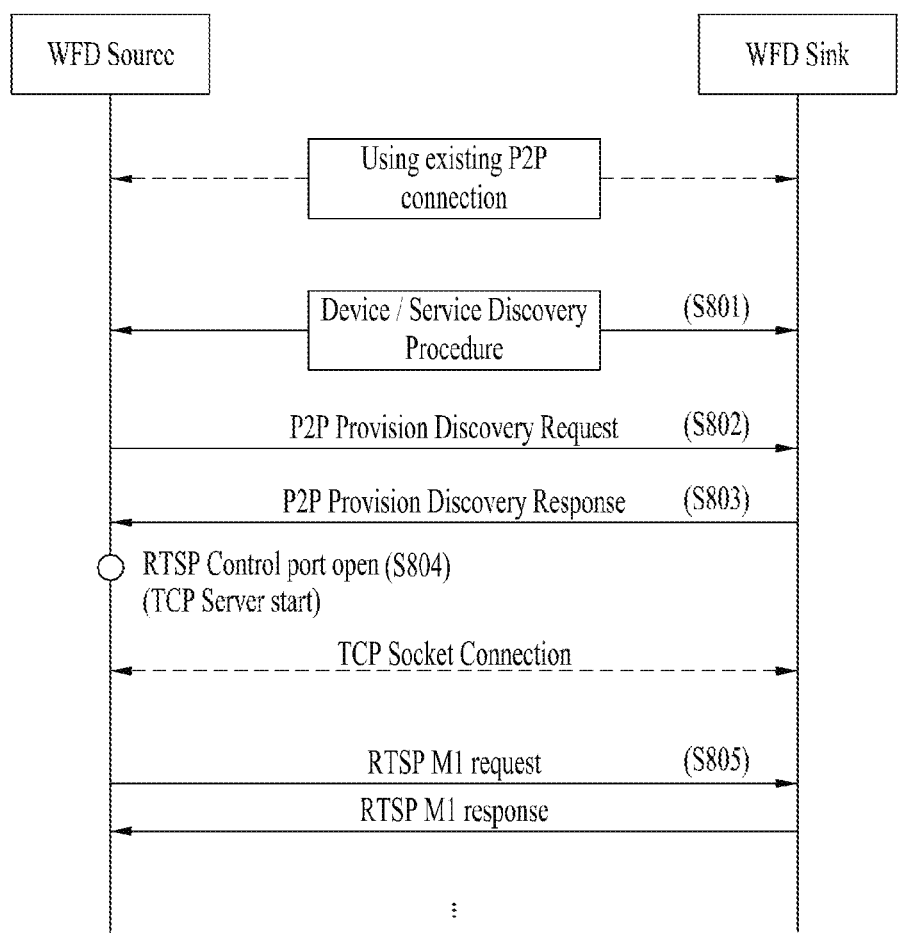
FIGS. 8 to 10 are flowcharts for explaining a provision discovery procedure according to embodiments of the present invention.

FIG. 8 is a flowchart for an example of a service/session initiation procedure according to one embodiment of the present invention. Prior to detail explanation, it is necessary to make clear that the procedure shown in FIG. 8 is just an example and it is not mandatory that all procedures are to be sequentially implemented. For example, it is not mandatory that a P2P provision discovery request is transmitted only when a device/service discovery procedure is performed.

Referring to FIG. 8, a source and a sink can perform a device/service discovery procedure in the step S801. For example, a first device can transmit a frame associated with a WFD discovery to a second device. Subsequently, the first device can transmit an RTSP M1 message to initiate an RTSP procedure and WFD capability negotiation [S805]. In this case, if an IP connection is already established between the first device and the second device (e.g., on the basis of frame transmission related to WFD discovery, etc.), the first device can transmit a provision discovery request to the second device before the M1 message is transmitted [S802]. If an IP connection is not established between the first device and the second device, as mentioned in the foregoing description, the first device can perform a connection setup procedure with the second device before the M1 message is transmitted.

After the provision discovery request is transmitted, the first device receives a provision discovery response from the second device [S803]. If information included in the provision discovery response corresponds to a positive response (e.g., success), it may be able to operate a TCP server for RTSP connection [S804]. In this case, a TCP port may correspond to a TCP port designated by a WFD Device Information sub element included in the provision discovery response or a TCP port determined in advance. If the TCP connection is completed, the source can transmit an RTSP M1 message [S805].

The aforementioned provision discovery request can include at least one selected from the group consisting of WFD IE, WSC IE, and P2P IE. The WFD IE can include a WFD device information sub element, an associated BSSID sub element, a coupled sink information sub element, a WFD extended capability sub element, and an infrastructure BSS sub element. Table 6 in the following shows an example of sub elements included in the provision discovery request.

TABLE 6

| Subelements | Subelement ID | Requirement |
|---|---|---|
| WFD Device Information | 0 | A WFD Device shall include the WFD Device Information subelement in the WFD IE in the Provision Discovery Request frames it transmits. |
| Associated BSSID | 1 | If a WFD Device is associated with an infrastructure AP or a GO and the WFD Device sets its PC bit to 0b1 in WFD Device Information subelement, the WFD Device shall include the Associated BSSID subelement in the WFD IE in the Provision Discovery Request frames it transmits. |
| Coupled Sink Information | 6 | If a WFD Sink supports the Coupled Sink Operation, the WFD Sink shall include the Coupled Sink Information subelement in the WFD IE in the Provision Discovery Request frames it transmits. |
| WFD Extended Capability | 7 | If a WFD Device intends to advertise its TDLS persistent capability to other WFD Devices during the discovery process, the WFD Device shall include the WFD Extended Capability subelement in the WFD IE in the Provision Discovery Request frames it transmits. |
| Infrastructure BSS attribute | TBD | If a WFD Device is associated with an infrastructure AP, the WFD Device shall include the Infrastructure BSSID subelement in the WFD IE in the Provision Discovery Request frames it transmits. |

And, the infrastructure BSS sub element can include information on an AP associated with the first device and, the infrastructure BSS sub element can be included in at least one selected from the group consisting of WSC IE, P2P IE and WFD IE. Table 7 in the following shows an example of an infrastructure BSS sub element format.

TABLE 7

| Field | Size (octets) | Value | Description |
|---|---|---|---|
| Attribute ID | 1 | TBD | Identifies the type of attribute. |
| Length | 2 | Variable | Length of the following fields in the attribute. |
| MAC Address | 6 | Variable | BSSID of the AP |
| Country String | 3 | | The Country String field is set to the value contained in the dot11CountryString attribute in the IEEE 802.11 specification, specifying the country code in which the Operating Class and Channel Number fields are valid. The third octet of the Country String field is set to x"04" to indicate that Table J-4 is used. |
| Operating Class | 1 | As defined in the IEEE 802.11 Annex J | Indicating the frequency band at which the P2P Device is in the Listen State. |
| Channel Number | 1 | As defined in the IEEE 802.11 Annex J | Indicating the channel number on which the P2P Device is in the Listen State. |
| SSID Length | 1 | Variable | Length of SSID |
| SSID | 0-32 | Variable | SSID of the AP |
| IP version | 1 | 0x04 0x06 | 0x04: IPv4 0x06: IPv6 |
| IP Address | 6-16 | variable | IP address of Wi-Fi interface which is connected with access point |

The provision discovery response can also include at least one selected from the group consisting of WFD IS, WSC IE, and P2P IE. The WFD IE can include a WFD device information sub element, an associated BSSID sub element, a coupled sink information sub element, a WFD session information sub element, a WFD extended capability sub element, an infrastructure BSS sub element, and a status sub element. Table 8 in the following shows an example of a provision discovery response including the WFD IE.

Figure 9:
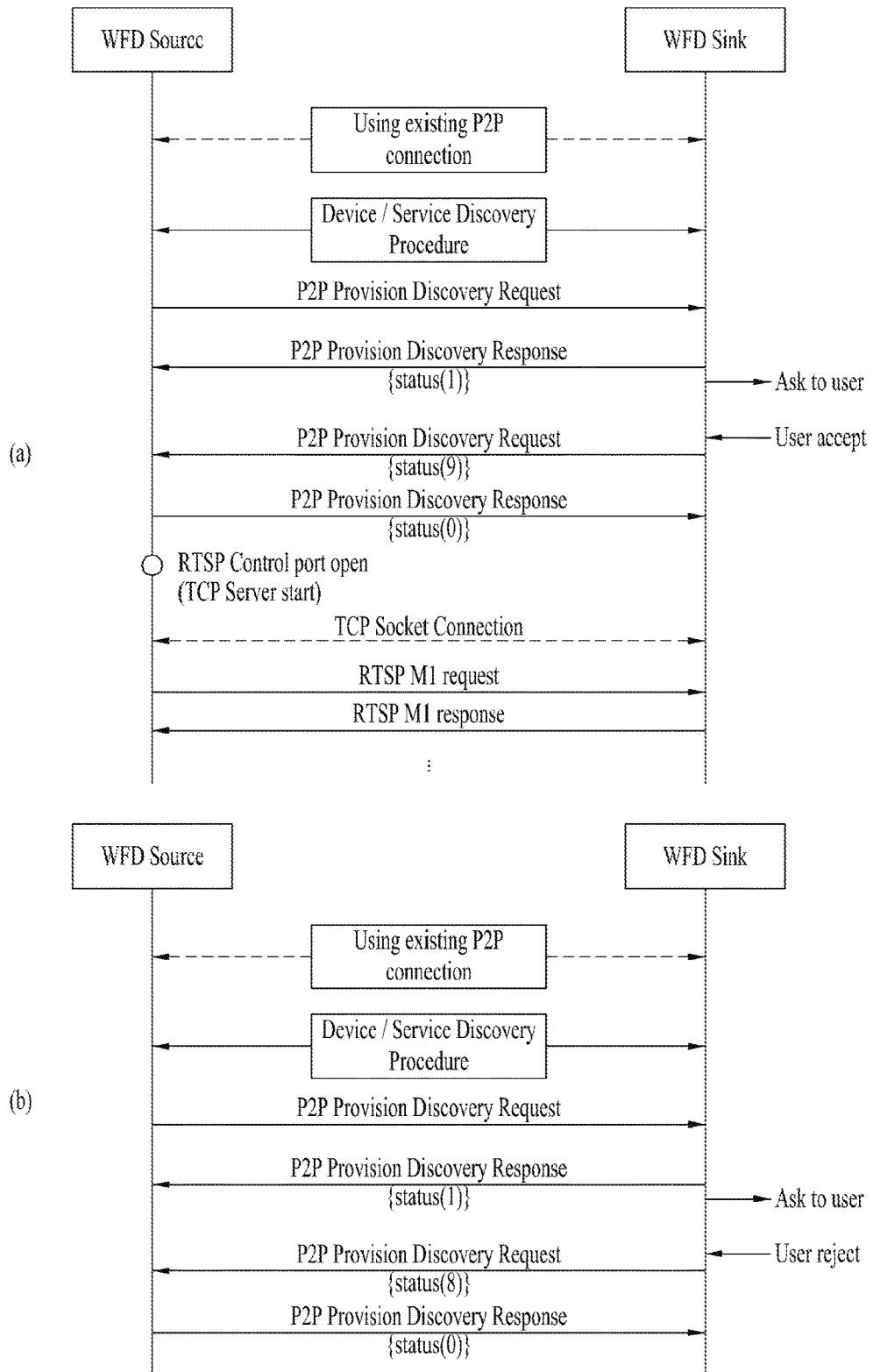

The first device can obtain information on an AP associated with the second device via the infrastructure BSS sub element. The infrastructure BSS sub element is shown in Table 5. The status sub element can indicate either a positive response or a negative response. The positive response and the negative response can be determined in a manner that the second device performs a user query procedure (Refer to FIG. 9. FIG. 9 (a) and FIG. 9 (b) show a success case and a failure case, respectively). A format of the status sub

TABLE 8

| Subelements | Subelement ID | Requirement |
|---|---|---|
| WFD Device Information | 0 | A WFD Device shall include the WFD Device Information subelement in the WFD IE in the Provision Discovery Response frames it transmits. |
| Associated BSSID | 1 | If a WFD Device is associated with an infrastructure AP or a GO and the WFD Device sets its PC bit to 0b1 in WFD Device Information subelement, the WFD Device shall include the Associated BSSID in the WFD IE in the Provision Discovery Response frames it transmits. |
| Coupled Sink Information | 6 | If a WFD Sink supports the Coupled Sink Operation, the WFD Sink shall include the Coupled Sink Information subelement in the WFD IE in the Provision Discovery Response frames it transmits. |
| WFD Session Information | 9 | If a WFD Capable GO has at least one associated client that is WFD capable, the WFD capable GO shall include the WFD Session Information subelement in the WFD IE in the Provision Discovery Response frames it transmits. |
| WFD Extended Capability | 7 | If a WFD Device intends to advertise its TDLS persistent capability to other WFD Devices during the discovery process, the WFD Device shall include the WFD Extended Capability subelement in the WFD IE in the Provision Discovery Response frames it transmits. |
| Infrastructure BSS attribute | TBD | If a WFD Device is associated with an infrastructure AP, the WFD Device shall include the Infrastructure BSSID subelement in the WFD IE in the Provision Discovery Request frames it transmits. |
| Status | TBD | A WFD Device shall include the Status subelement in the WFD IE in the Provision Discovery Response frames it transmits. | element is shown in Table 9 in the following. Table 10 shows a reason code corresponding to a status code field value included in the status sub element.

TABLE 9

| Field | Size (octets) | Value | Description |
|---|---|---|---|
| Attribute ID | 1 | TBD | Identifying the type of WFD subelement. The specific value is defined in Table 5. |
| Length | 2 | 1 | Length of the following fields in the attribute. |
| Status Code | 1 | 0-255 | A status code. The list of valid status codes and their meaning is defined in Table 8. |

TABLE 10

| | |
|---|---|
| 0 | Success |
| 1 | Fail; information is currently unavailable. |
| 2 | Fail; incompatible parameters. |
| 3 | Fail; limit reached. |
| 4 | Fail; invalid parameters. |
| 5 | Fail; unable to accommodate request. |
| 6 | Fail; previous protocol error, or disruptive behavior. |
| 7 | Fail; incompatible provisioning method. |
| 8 | Fail; rejected by user. |
| 9 | Success: accept by user |
| 9-255 | Reserved |

Figure 10:
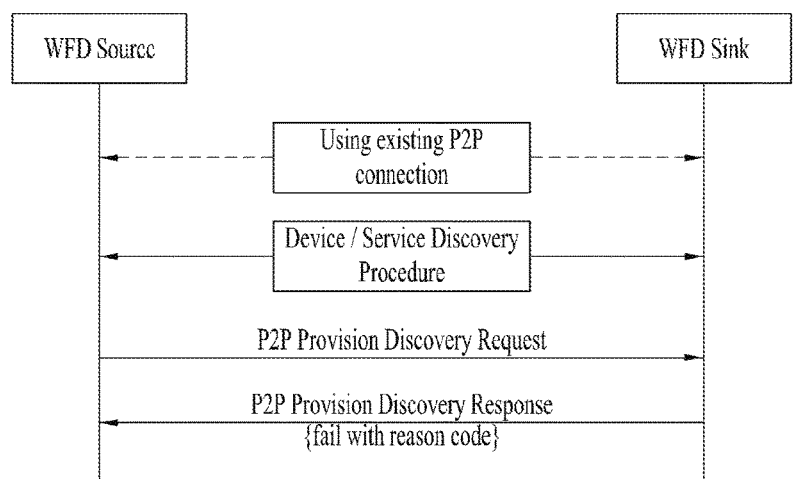
Figure 11:
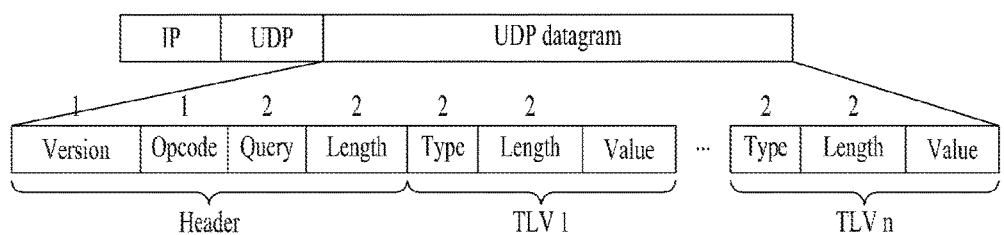
FIGS. 11 to 15 are diagrams for explaining initiation of a WFD session using an IP packet according to embodiments of the present invention.

If the sink is currently unable to initiate a WFD session, the provision discovery response may indicate failure. In this case, the first device may recognize a reason of the failure via a reason code. FIG. 10 shows a flowchart for the aforementioned case.

Embodiment 2-1

A second embodiment relates to initiation of a WFD session using an IP packet. If a WFD device has an IP layer connection (device/service discovery completion), the WFD device can perform discovery and/or RTSP start request/response of the WFD device in an IP layer via a WFD control protocol.

The WFD device can receive a packet via a UDP/TCP port in an IP connection state. A WFD control packet can be unicasted with a specific IP address or can be broadcasted to the whole of subnets. A format of a WFD control protocol is shown in Table 11 in the following. As shown in Table 11, a header can include a version, an Opcode (message type), a query, and a length field. At least one or more TLV fields appearing after the length field can include a subelement defined in WFD.

The RTSP start request/response corresponds to a procedure for driving RTSP corresponding to a control plane of WFD which is performed after the discovery procedure is performed. An RTSP start request can be transmitted by either the source or the sink. In an RTSP start request packet, a destination address can be configured by an IP address of a counterpart device and can include a version field, an Opcode field, a query field, a length field, and a TLV field(s). In this case, the TLV field can deliver previously defined sub elements including WFD IE (WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, and Alternative MAC Address subelement). Table 11 in the following shows an example of the RTSP start request packet.

TABLE 11

| Field | Example of description |
|---|---|
| VERSION | 0b00100000 |
| Opcode | 2 (WFD RTSP Start Request) |
| Query bitmap | Query bit map is set to all zeros |
| Length | Sum of total length of lower TLV |
| TLV fileds | WFD IE |

An RTSP start response packet is transmitted in unicast. Similar to the RTSP start request packet, the RTSP start response packet can include a version field, an Opcode field, a query field, a length field, and a TLV field(s). Table 12 in the following shows an example of the RTSP start response packet.

TABLE 12

| Field | Example or description |
|---|---|
| VERSION | 0b00100000 |
| Opcode | 3 (WFD RTSP Start Response) |
| Query bitmap | Query bit map is set to all zeros |
| Length | Sum of total length of lower TLV |
| TLV fileds | WFD IE |

Figure 12:
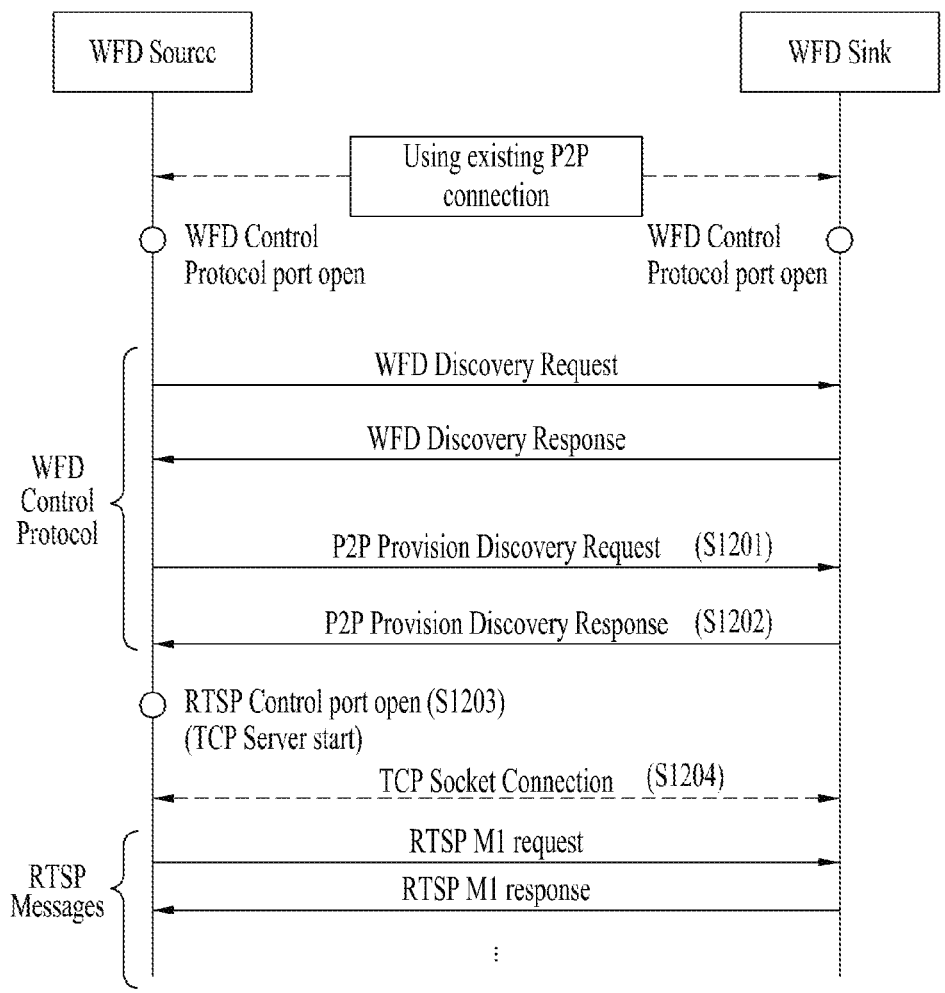

It may be able to initiate an RTSP message sequence using the aforementioned RTSP request/response packet. This procedure is shown in FIG. 12. Referring to FIG. 12, if a WFD RTSP start request/response is successfully exchanged [S1201, S1202], the source opens a TCP port for RTSP and operates a TCP server [S1203]. Subsequently, the sink establishes a TCP connection [S1204] and waits for receiving an RTSP M1 request message. Subsequently, an RTSP M1 message is exchanged. Following procedure can be performed based on a procedure defined in a legacy WFD.

Embodiment 2-2

Figure 13:
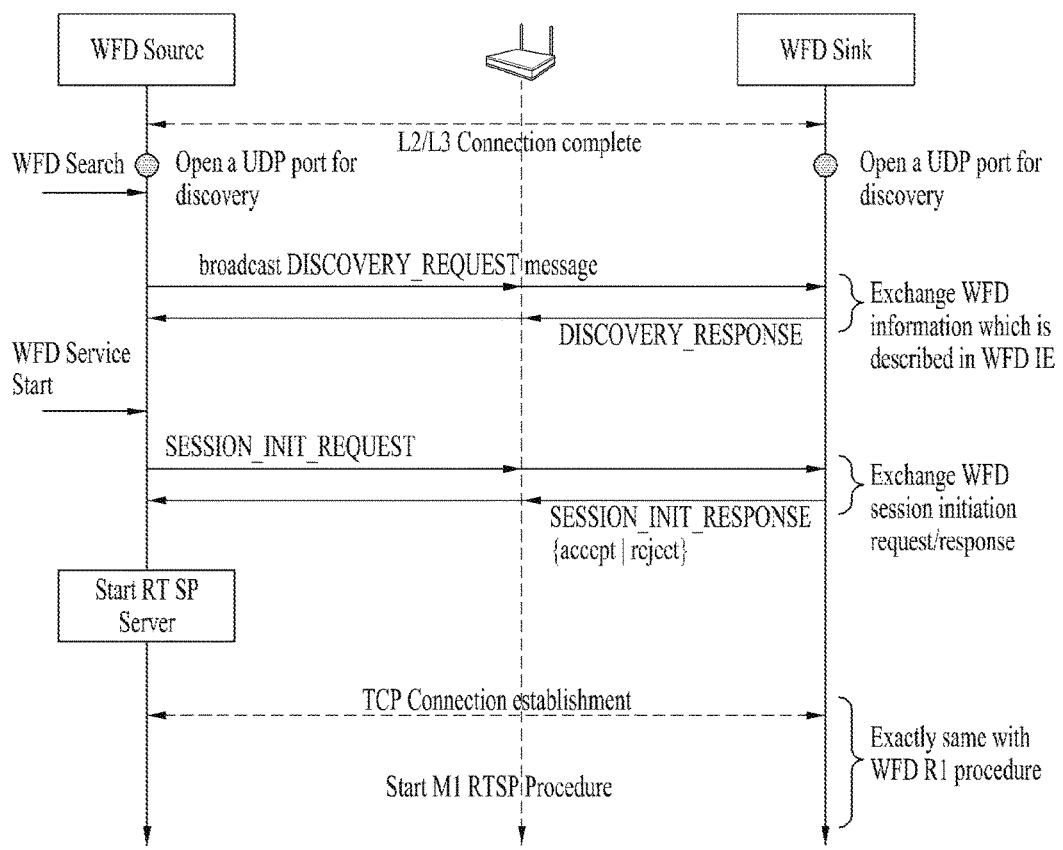
Figure 14:
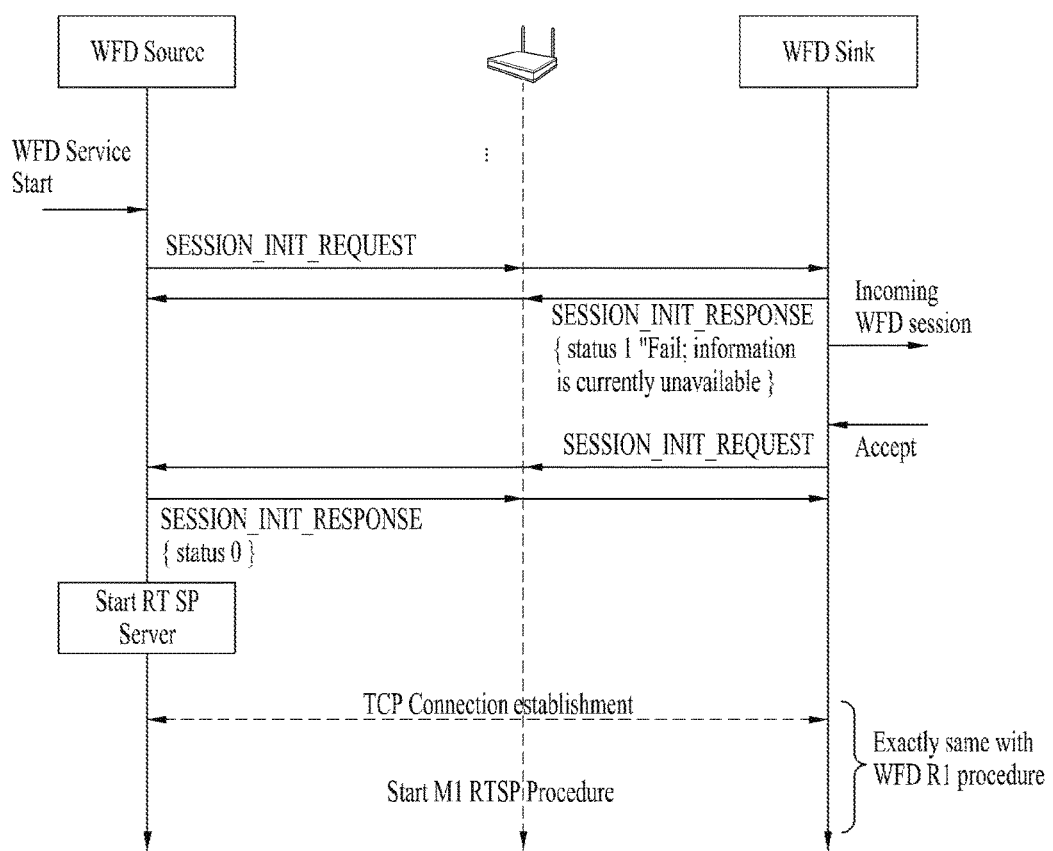

After the discovery procedure is performed, a session initiation request/response can be exchanged to initiate a session. Referring to FIG. 13, after the discovery procedure, the source transmits a session initiation request. Having received the session initiation request, the sink can transmit a session initiation response. In this case, the session initiation response may correspond to either WFD session initiation acceptance or denial. FIG. 14 shows an example of a deferred WFD session initiation procedure. When the sink receives a session initiation request from the source, as shown in FIG. 13, the sink can transmit a session initiation response including information indicating deferrer (status 1 "Fail; information is currently unavailable (during 120 s))" instead of making a response by acceptance or denial. Subsequently, if the sink is available for session initiation, the sink can start session initiation by transmitting a session initiation request to the source.

Figure 15:
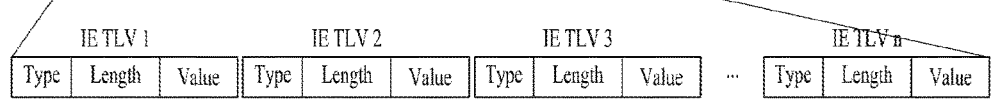
Figure 15:
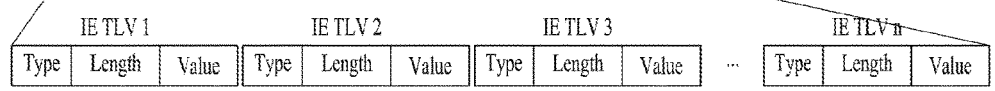

FIG. 15 (a) shows an example of the session initiation request message and FIG. 15 (b) shows an example of a session initiation request message. In FIG. 15 (a), a TLV 1 may correspond to P2P status, IE TLV 2 may correspond to WFD device information, IE TLV 3 may correspond to an associated BSSID, and IE TLV 4 may correspond to coupled sink information. In FIG. 15 (b), a TLV 1 may correspond to P2P status, IE TLV 2 may correspond to WFD device information, IE TLV 3 may correspond to an associated BSSID, IE TLV 4 may correspond to coupled sink information, and IE TLV 5 may correspond to WFD session information.

Embodiment 3

Third embodiment relates to RTPS initiation using UPnP. Specifically, the third embodiment relates to procedures of defining a UPnP action and defining the UPnP action in a service description document. To this end, such an action as MiracastInit can be defined in an action list. In order to perform the action, two arguments including RTSP IP_PORT and DeviceFreiendlyName can be included. In this case, for example, RTSP IP_PORT URI corresponds to information including an IP address and a port number such as 192.168.1.1:7236 and the DeviceFreiendlyName includes a name of a user identification device. A user can identify a device through the DeviceFreiendlyName. The defined action can be transmitted to the sink by the source. If the action is successfully transmitted and received, the source opens an RTSP source and waits for an RTSP session. The sink establishes an RTSP connection using a corresponding RTSP URI and waits for an M1 request message. Table 13 in the following shows an example of defining the action.

TABLE 13

MiracastSinkServiceDescription.xml

```
<?xml version="1.0" ?>
 <scpd xmlns="urn:schemas-upnp-org:service-1-0">
  <specVersion>
    <major>1</major>
<minor>0</minor>
</specVersion>
<actionList>
  <action>
    <name>MiracastInit</name>
  <argumentList>
    <argument>
      <name>RTSP_IP_PORT</name>
      <direction>in</direction>
      <relatedStateVariable> X_RTSPSessionURI</relatedStateVariable>
</argument>
    <argument>
      <name>DEVICE_FRIENDLY_NAME</name> direction>in
      </direction>
      relatedStateVariable> X_DeviceFriendlyName</relatedStateVariable>
</argument>
      </argumentList>
</action>
</actionList>
<serviceStateTable>
<stateVariable sendEvents="no">
    <name>RTSPSessionURI </name>
    <dataType>string</dataType>
</stateVariable>
<stateVariable sendEvents="no">
    <name>DeviceFriendlyName </name>
    <dataType>string</dataType>
</stateVariable>
</serviceStateTable>
</scpd>
```

Figure 16:
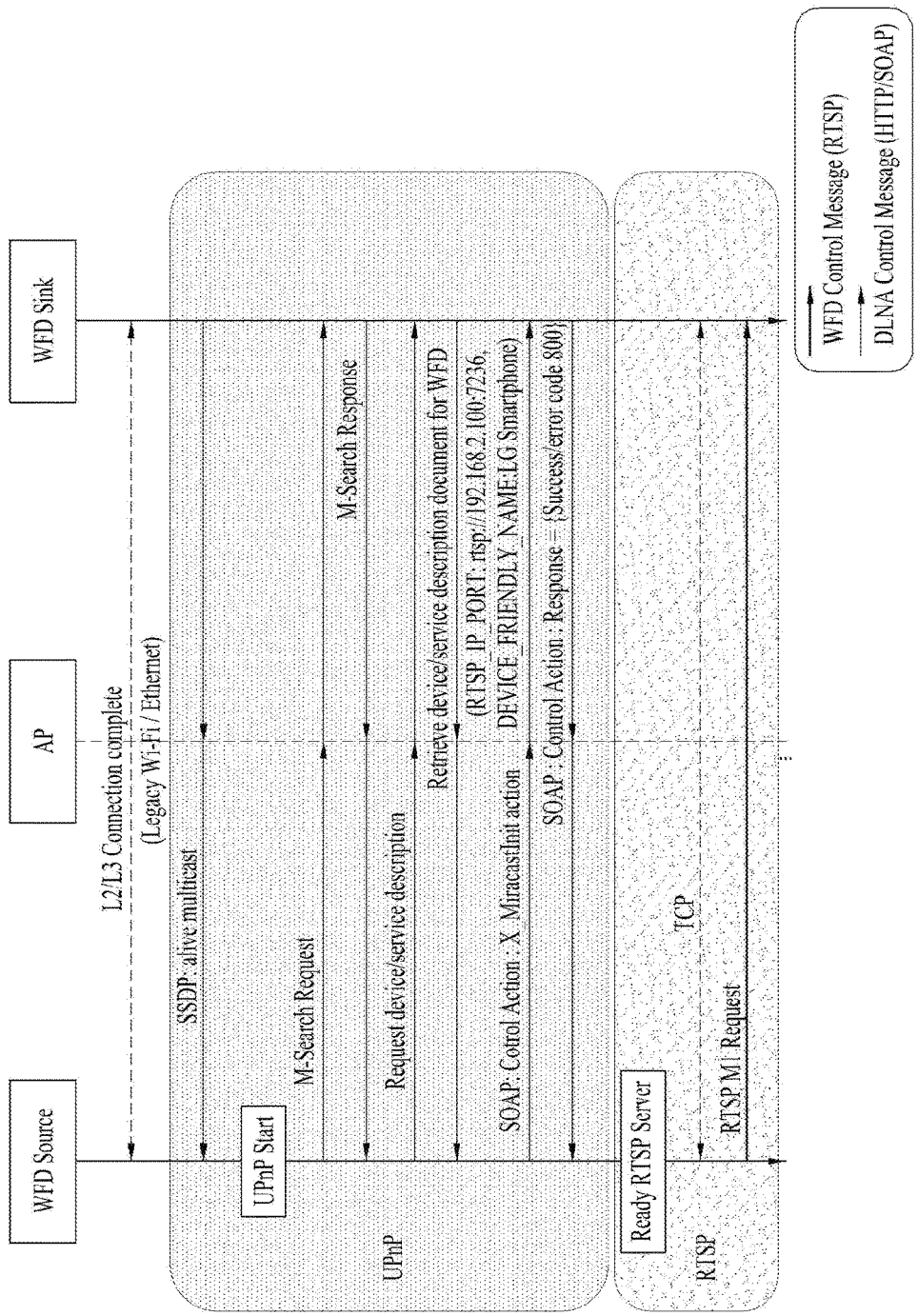
FIG. 16 is a diagram for explaining connection of a WFD session using ASP according to embodiments of the present invention.

FIG. 16 shows an embodiment of initiating WFD RTSP using a vendor-specific SOAP action such as 'X_MiracastInit'.

Embodiment 4

Figure 17:
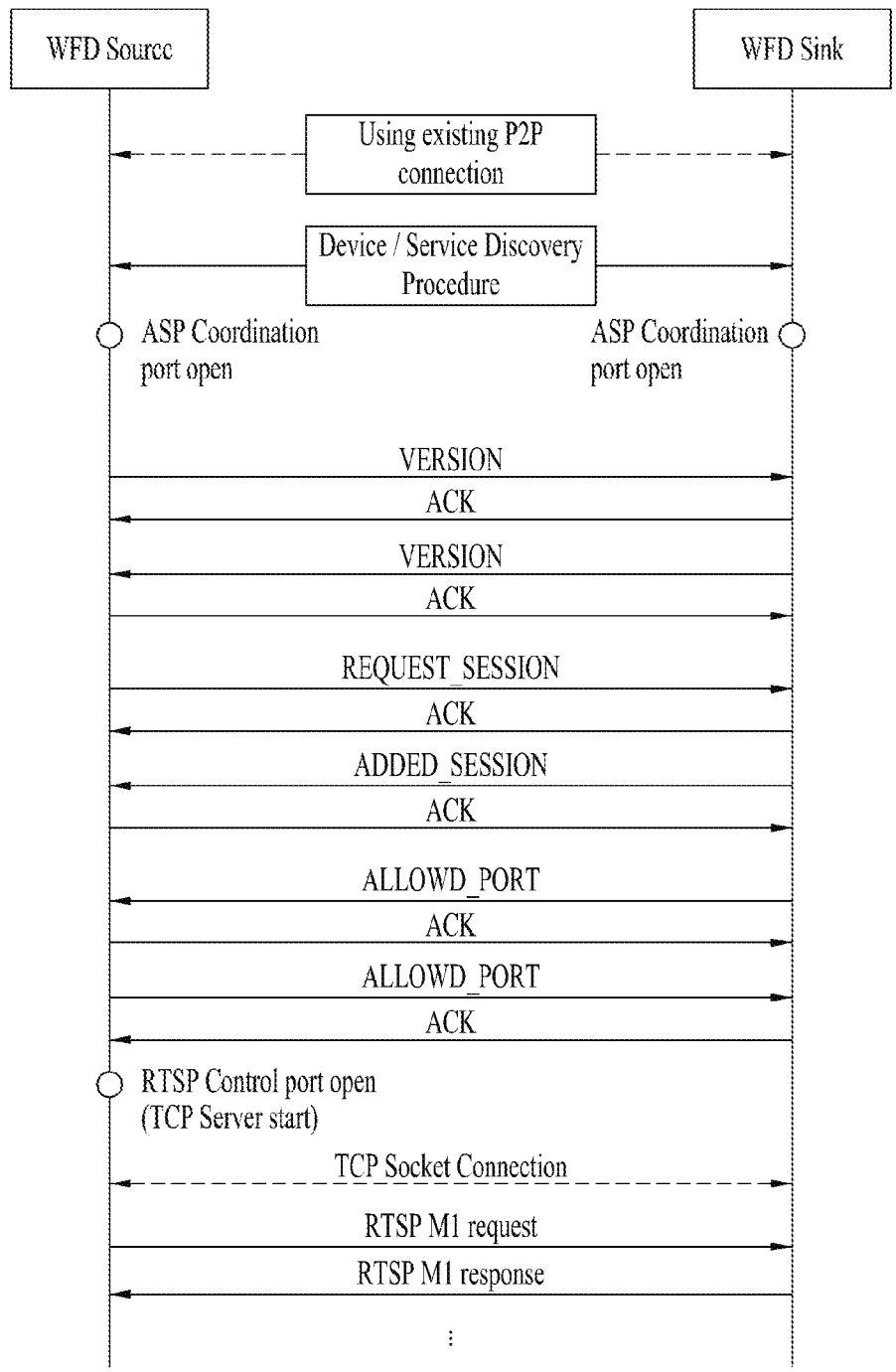
FIG. 17 is a diagram for explaining connection of a WFD session using ASP according to embodiments of the present invention.

Fourth embodiment relates to establishment of a connection of a WFD session using ASP. In particular, if a WFD device supports WFDS, a WFD session is connected by reusing a pre-existing P2P connection according to a legacy WFDS procedure. This procedure is shown in FIG. 17.

Figure 18:
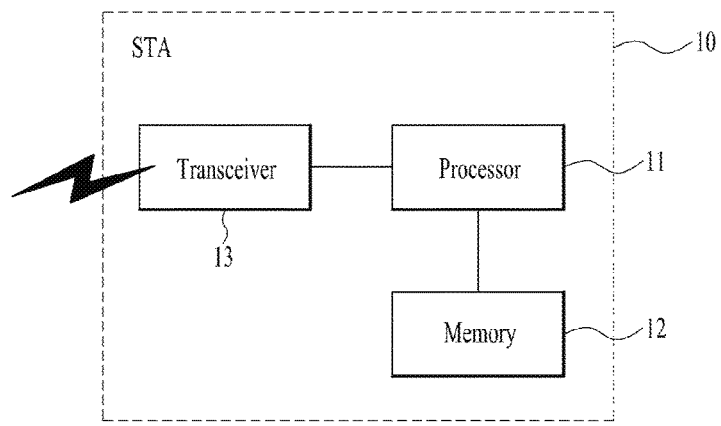
FIGS. 18 to 19 are block diagram for a configuration of a wireless device according to one embodiment of the present invention.

FIG. 18 is a block diagram for a configuration of a wireless device according to one embodiment of the present invention.

A wireless device 10 can include a processor 11, a memory 12 and a transceiver 13. The transceiver 13 can transmit/receive a radio signal. For instance, the transceiver can implement a physical layer according to IEEE 802 system. The processor 11 can implement a physical layer and/or an MAC layer according to IEEE 802 system in a manner of being connected with the transceiver 13. The processor 11 can be configured to perform one or more operations among application, a service and an ASP layer according to the aforementioned various embodiments of the present invention or can be configured to perform an operation related to a device operating as an AP/STA. A module configured to implement operations of the wireless device according to the aforementioned various embodiments of the present invention is stored in the memory 12 and can be executed by the processor 11. The memory 12 can be included in the internal of the processor 11 or installed in the external of the processor 11 and can be connected with the processor 11 by a means well known to public.

Concrete configuration of the wireless device 10 of FIG. 18 can be implemented to make the items mentioned earlier in the various embodiments of the present invention to be independently applied or make two or more embodiments to be applied at the same time. For clarity, explanation on overlapped contents is omitted.

Figure 19:
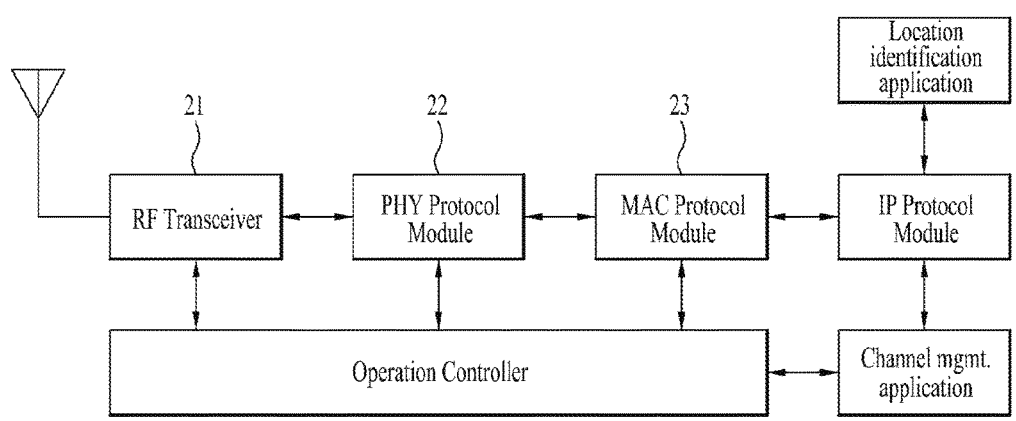

FIG. 19 is a diagram for a different configuration of a wireless device according to one embodiment of the present invention.

Referring to FIG. 19, an RF transceiver 21 moves information generated in a PHY protocol module 22 to an RF spectrum an transmits the information via antenna by performing filtering or amplifying on the information. The RF transceiver moves an RF signal received via antenna to a band capable of processing the RF signal by the PHY protocol module and performs such a function as filtering and the like on the RF signal. The RF transceiver may include a switching function for switching a function between transmission and reception.

The PHY protocol module 22 performs such a processing as FEC encoding and modulation, inserting an additional signal such as a preamble, a pilot signal and the like on data required by a MAC protocol module 23 and delivers the data to the RF transceiver. And, the PHY protocol module performs such a processing as demodulation, equalization, FEC decoding and eliminating a signal added by the PHY layer on a signal received from the RF transceiver and delivers data to the MAC protocol module. To this end, the PHY protocol module can include a modulator, a demodulator equalizer, a FED encoder, a FEC decoder, and the like.

In order to deliver or transmit data delivered from a higher layer to the PHY protocol module, the MAC protocol module 23 performs a required process. Or, the MAC protocol module is in charge of additional transmissions to make basic communication to be performed. To this end, the MAC protocol module processes data required by the higher layer to be appropriated for transmission and transmits/delivers the data to the PHY protocol module. And, the MAC protocol module processes data received from the PHY protocol module and delivers the data to the higher layer. And, the MAC protocol module is also in charge of additional transmission and reception necessary for delivering data to process a communication protocol.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

INDUSTRIAL APPLICABILITY

Although various embodiments of the present invention are explained centering on IEEE 802.11 system, the embodiments of the present invention can be applied to various mobile communication systems with an identical scheme.

What is claimed is:

1. A method of initializing a Wi-Fi Display (WFD) service, which is initialized by a first device supporting WFD, comprising the steps of:
   transmitting a frame related to a WFD discovery to a second device by the first device; and
   transmitting a real-time streaming protocol (RTSP) M1 message to the second device,
   wherein when the frame related to the WFD discovery is transmitted, and when an internet protocol (IP) connection is established between the first device and the second device, the first device transmits either a provision discovery request or a session initiation request to the second device before the M1 message is transmitted.

2. The method of claim 1, wherein when the frame related to the WFD discovery is transmitted, and when an IP connection is not established between the first device and the second device, the first device performs a connection setup procedure with the second device before the M1 message is transmitted.

3. The method of claim 1, further comprising the step of receiving a provision discovery response from the second device in response to the provision discovery request.

4. The method of claim 3, wherein if the provision discovery response corresponds to a positive response, the first device initiates a Transmission Control Protocol (TCP) server operation.

5. The method of claim 4, wherein the provision discovery response comprises at least a Wi-Fi Display Information Element (WFD IE), a Wi-Fi Simple Configuration Information Element (WSC IE) or a Peer-to-Peer Information Element (P2P IE).

6. The method of claim 5, wherein the WFD IE comprises a WFD device information sub element, an associated Basic Service Set Identification (BSSID) sub element, a coupled sink information sub element, a WFD extended capability sub element, an infrastructure Basic Service Set (BSS) sub element, and a status sub element.

7. The method of claim 6, wherein the first device obtains information on an access point (AP) associated with the second device via the infrastructure BSS sub element.

8. The method of claim 6, wherein the status sub element indicates either the positive response or a negative response.

9. The method of claim 8, wherein the positive response and the negative response are determined by performing a user query procedure performed by the second device.

10. The method of claim 1, wherein the provision discovery request comprises at least a Wi-Fi Display Information Element (WFD IE), a Wi-Fi Simple Configuration Information Element (WSC IE) or a Peer-to-Peer Information Element (P2P IE).

11. The method of claim 10, wherein the WFD IE comprises a WFD device information sub element, an associated Basic Service Set Identification (BSSID) sub element, a coupled sink information sub element, a WFD extended capability sub element, and an infrastructure Basic Service Set (BSS) sub element.

12. The method of claim 11, wherein the infrastructure BSS sub element comprises information related to an access point (AP) associated with the first device.

13. The method of claim 1, wherein the session initiation request comprises an IP header, a user datagram protocol (UDP) header, and a UDP datagram.

14. The method of claim 1, wherein the first device corresponds to a WFD source and wherein the second device corresponds to a WFD sink.

15. The method of claim 1, further comprising the step of receiving an RTSP M1 response message from the second device,
   wherein the RTSP M1 response message comprises information on an RTSP method supported by the second device.

16. A first device supporting Wi-Fi Display (WFD), comprising:
   a transceiver; and
   a processor;
   wherein the processor control the transceiver to transmit a frame related to a WFD discovery to a second device, and the processor control the transceiver to transmit an RTSP (real-time streaming protocol) M1 message to the second device,
   wherein when the frame related to the WFD discovery is transmitted, and when an internet protocol (IP) connection is established between the first device and the second device, the first device transmits a provision discovery request to the second device before the M1 message is transmitted.

* * * * *